K. V. BENNIS.
SHOCK ABSORBER.
APPLICATION FILED JAN. 17, 1914.
1,120,013.
Patented Dec. 8, 1914.
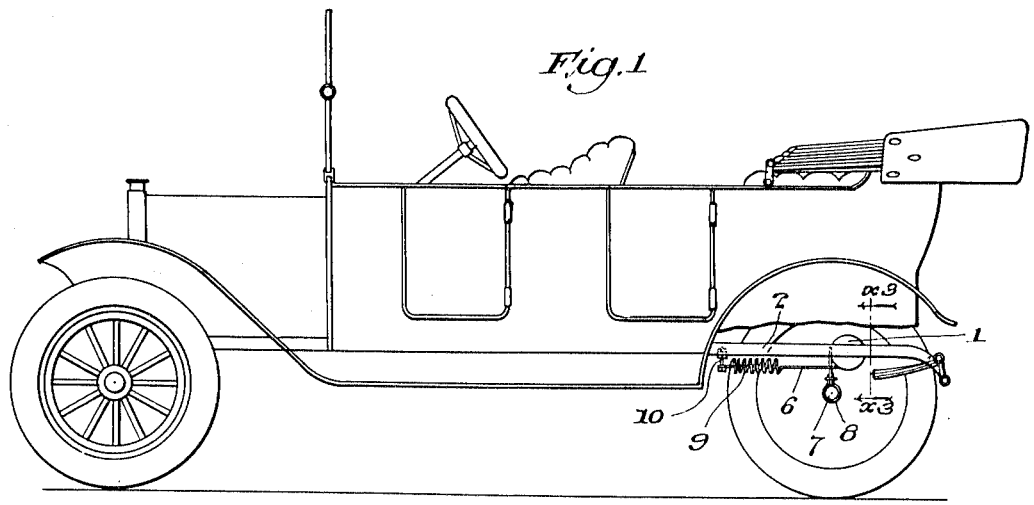
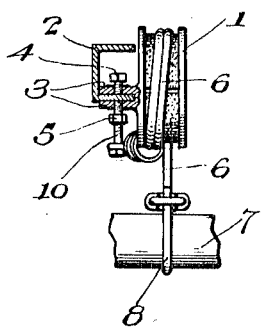
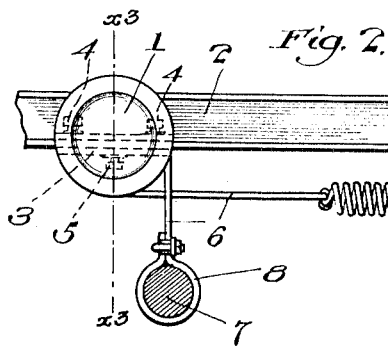
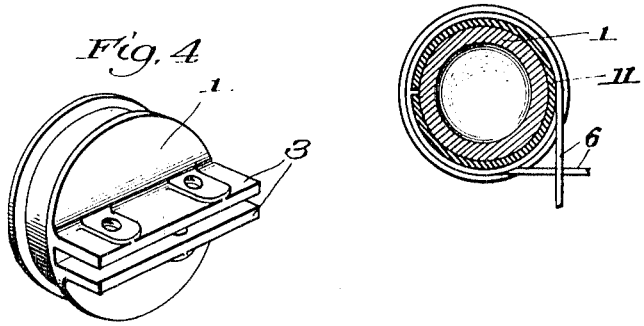
Witnesses:
Inventor:
Karl V. Bennis,
By Lyon & Hackley
Attys

UNITED STATES PATENT OFFICE.

KARL VUCASSOVICH BENNIS, OF LOS ALAMITOS, CALIFORNIA.

SHOCK-ABSORBER.

1,120,013.      Specification of Letters Patent.      Patented Dec. 8, 1914.

Application filed January 17, 1914. Serial No. 812,679.

*To all whom it may concern:*

Be it known that I, KARL V. BENNIS, a citizen of the United States, residing at Los Alamitos, in the county of Orange and State of California, have invented a new and useful Shock-Absorber, of which the following is a specification.

This invention relates to shock absorbers, and the object is to provide a shock absorber of economical and simple construction, which can be quickly attached to an automobile, and will operate to cushion the rebound or upward movement of the body of the automobile, and which will not hinder the downward movement.

Referring to the drawings: Figure 1 is a side elevation of the automobile equipped with the invention, part of the frame being broken away to show one of the shock absorbers. Fig. 2 is an enlarged side elevation of the shock absorber in detail and adjacent part of the automobile frame and axle. Fig. 3 is a section on line $x^3$—$x^3$, Fig. 2. Fig. 4 is a perspective in detail of a drum. Fig. 5 is a section through the drum transverse to its axis.

The shock absorber comprises a non-revoluble drum 1, which may be attached in any convenient way to the frame 2 of the automobile, as, for example, by providing the drum 1 with a pair of flanges 3, which may be secured by set screws 4 and 5, as clearly shown in Fig. 3. Passing around the drum with one or more coils is a cable 6, one end of which is attached to the axle 7 in any desired way, as by means of passing it around the axle and securing the end by a clamp 8. The other end of the cable 6 is attached to an extension spring 9, which in turn is connected to a bolt 10, which projects from the frame 2. Encircling the drum is a friction band 11 consisting of leather or any other suitable material. The coils of cable bear against the friction band and as they contract they cause the friction band to grip the drum, and when they slacken the friction band relaxes its grip on the drum.

In operation, the spring 9 is of sufficient strength to take up slack in the cable 6, so that it is normally taut and contracts the friction band to frictionally grasp the non-revoluble drum 1. When the body of the automobile springs downward, moving nearer to the axle 7, this downward movement is readily permitted by the cable 6, as there is a relaxation of the cable due to the movement of the drum 1 toward the axle 7. The spring, however, prevents any slack forming in the cable, and upon the rebound or upward movement of the body 2, the cable 6 contracts and causes the friction band to grip the drum 1, so that the spring 9 is placed under greater tension and acts to oppose the sudden upward movement of the body 2, thereby softening the shock. During the downward movement of the drum 1, the effect between the drum and cable is as that of an unwinding action, while during the upward movement of the drum 1, the effect of the cable on it is that similar to a winding up action of the cable, in the first instance, resulting in the slackening of the grip of the cable, and in the second instance, acting to continue the grip to such a degree that it causes the spring 9 to be brought into play and elongated. After the body 2 has moved completely upward and reached its normal position, the cable 6 gradually slips around on the drum 1, and the spring 9 resumes its normal position.

What I claim is:

In a shock absorber, in combination with the frame of a vehicle and the axle, a non-revoluble friction drum provided with two closely arranged flanges to receive a flange of the frame, means for securing said drum flange to the frame flange, a cable wound around the drum, one end of the cable being secured to the axle, a spring secured to the other end of the cable and to the frame, and an expansible friction band around the drum against which the coiled cable bears.

Signed at Los Angeles, Cal., this 10th day of January 1914.

KARL VUCASSOVICH BENNIS.

Witnesses:
    G. T. HACKLEY,
    LORRAINE E. DURROW.